(12) United States Patent
Ryan et al.

(10) Patent No.: US 10,454,513 B2
(45) Date of Patent: *Oct. 22, 2019

(54) PHONE HOLDER

(71) Applicant: Camel IP Pty Ltd, Alderly (AU)

(72) Inventors: Christopher John Ryan, Clayfield (AU); Alexei Kholodov, Scarborough (AU)

(73) Assignee: CAMEL IP PTY LTD, Queensland (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,010

(22) Filed: Mar. 30, 2017

(65) Prior Publication Data

US 2017/0207810 A1   Jul. 20, 2017

Related U.S. Application Data

(63) Continuation of application No. 14/106,915, filed on Dec. 16, 2013, now Pat. No. 9,647,712.

(30) Foreign Application Priority Data

Dec. 19, 2012   (AU) ................ 2012905555

(51) Int. Cl.
| | | |
|---|---|---|
| *H04B 1/00* | (2006.01) |
| *H04B 1/3888* | (2015.01) |
| *H04B 1/3883* | (2015.01) |
| *B60R 11/02* | (2006.01) |
| *B60R 11/00* | (2006.01) |
| *H04W 4/80* | (2018.01) |
| *H04M 1/725* | (2006.01) |

(52) U.S. Cl.
CPC ........ *H04B 1/3888* (2013.01); *B60R 11/0241* (2013.01); *H04B 1/3883* (2013.01); *B60R 2011/0005* (2013.01); *B60R 2011/0075* (2013.01); *H04M 1/7253* (2013.01); *H04W 4/80* (2018.02)

(58) Field of Classification Search
CPC ..... H04B 1/3888; H04B 1/3883; H04W 4/80; H04M 1/7253; B60R 11/0241; B60R 2011/0005; B60R 2011/0075
USPC .............................................. 455/573, 569.2
See application file for complete search history.

(56) References Cited

U.S. PATENT DOCUMENTS

| | | |
|---|---|---|
| 6,176,457 B1 | 1/2001 | Soderstrom |
| 2002/0100782 A1 | 1/2002 | Marvin |
| 2002/0176571 A1 | 11/2002 | Louh |

(Continued)

FOREIGN PATENT DOCUMENTS

| | | |
|---|---|---|
| DE | 2998931 U1 | 9/1999 |
| EP | 0839689 A1 | 5/1998 |

(Continued)

*Primary Examiner* — Ping Y Hsieh
(74) *Attorney, Agent, or Firm* — DeLio Peterson & Curcio LLC; Thomas E. Ciesco

(57) ABSTRACT

The present invention relates to a phone holder for holding a mobile phone. The holder includes at least one lateral support. At least one insert can be located between the lateral support and the phone. Preferably, the insert can be replaceable, and the lateral support is manufactured separately and fastenable to a common body used with holders for multiple phone types.

19 Claims, 5 Drawing Sheets

(56) References Cited

U.S. PATENT DOCUMENTS

| | | | |
|---|---|---|---|
| 2003/0148740 A1* | 8/2003 | Yau | H02J 7/0044 |
| | | | 455/575.1 |
| 2009/0294617 A1 | 12/2009 | Stacey et al. | |
| 2010/0264182 A1* | 10/2010 | Perlman | H04M 1/04 |
| | | | 224/409 |
| 2011/0104941 A1 | 5/2011 | Chang et al. | |

FOREIGN PATENT DOCUMENTS

| | | |
|---|---|---|
| JP | 2000165497 A | 6/2000 |
| WO | 2011034411 A1 | 3/2011 |

* cited by examiner

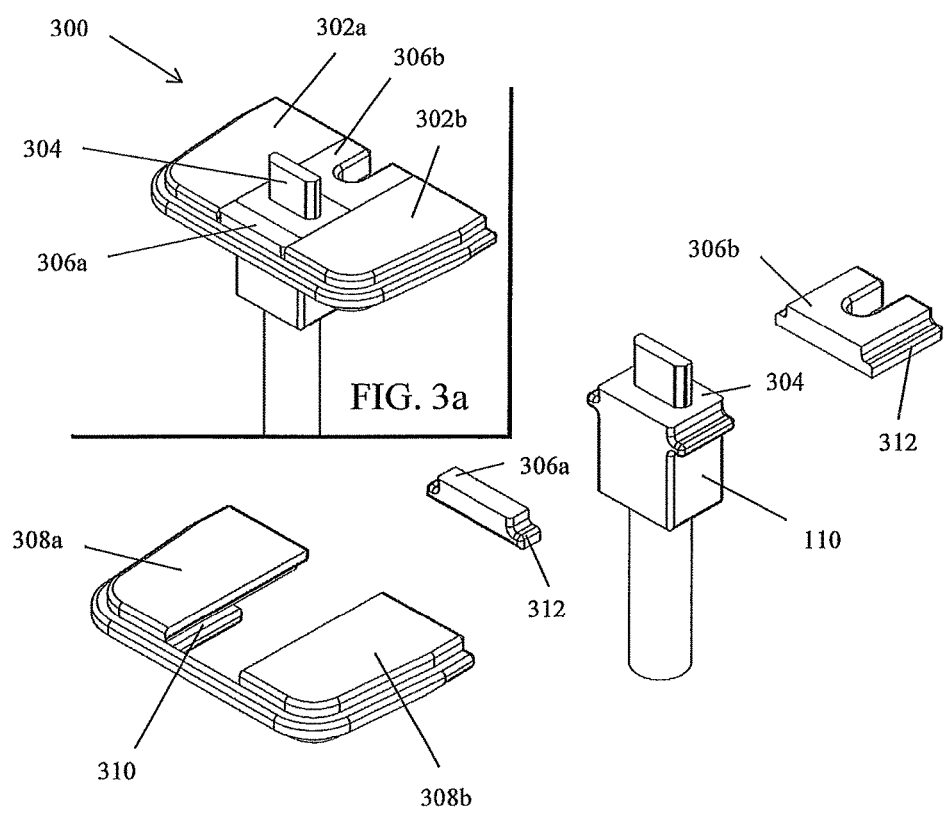

PHONE HOLDER

TECHNICAL FIELD

The present invention relates to a phone holder. The present invention has particular, although not exclusive application to an automotive phone holder.

BACKGROUND

The reference to any prior art in this specification is not, and should not be taken as an acknowledgement or any form of suggestion that the prior art forms part of the common general knowledge.

Many Australian drivers are killed or have accidents when using their mobile phones each year. However, despite the risks, many drivers continue to use their phones when driving in spite of the apparent risks and potential for attracting a fine when breaking the law through illegal phone use.

Automotive phone holders are known in which the phone can be placed to avoid the dangerous practice of fidgeting with the phone in the car. However, such phone holders are normally specifically designed for a single type of phone which can be problematic, particularly considering that multiple types of holders must be manufactured to accommodate the various types of phones.

Embodiments of the present invention provide an improved automotive phone holder.

SUMMARY OF THE INVENTION

According to one aspect of the present invention, there is provided a phone holder for holding a mobile phone, the holder including:
lateral support means; and
insert means for locating between the lateral support means and the phone.

Preferably, the insert means is replaceable enabling the holder to snugly hold the phone by selecting a suitable insert means, irrespective of whether the phone is in a case. Similarly, the lateral support means may be manufactured separately and then fastened to a common body used with holders for all phone types. Manufacturing costs are reduced because a single mold is required for the common body.

The holder may include a location means by which the phone can detect that it is located in or near the holder. Advantageously, the phone can then have enabled certain Applications (Apps) or functions particular to driving such as Bluetooth on/off, screen dimming, GPS, caller ID, music etc. The location means may include a near field communication (NFC) integrated circuit (IC).

Preferably, the insert means is located between said lateral support means and at least one lateral edge of the phone. The lateral support means may include a pair of molded jaws between which a display of the held phone can be located. The insert means may include a pair of molded resilient rubber inserts. Each insert may define inwardly extending ribs. Each insert may engage with a lateral edge and the front of the phone. Each insert may interlock at a front and rear with a jaw.

The holder may define a body from which the lateral support means extends. Each insert may hold the phone in compression against the body.

The holder may include a phone charger for charging the held phone. The holder may include a charger coupler for coupling the charger to the phone. The charger coupler may include a support for supporting the base of the phone.

Optionally, the support may include a pair of rails, a connector able to move along the rails, and at least one spacer for spacing the connector along the rails. The rails may include plates defining opposing channels for receiving the connector and spacer. The connector and spacer may include opposed ribs for being received in respective channels. The spacer may include separable parts. The connector may include a micro USB connector.

Optionally, the support may include a pair of positioning members defining a channel for receiving and positioning a phone connector, and at least one insert for positioning the connector relative to an upper surface of the support. The insert may be of any suitable height. The connector may include an Apple Lightning or 30-pin connector, micro USB or other depending on the phone being docked.

Optionally, the support may include an upper member and a lower member, between which a phone connector can be secured. The upper and lower members may each include an aperture for receiving the connector. The connector may include a micro USB connector.

The holder may include an auxiliary antenna arrangement for coupling to an antenna of the held phone to boost reception. The coupling may be an electromagnetic or electrical coupling. The holder may include a releasable molded antenna coupler for coupling the auxiliary antenna arrangement to the phone antenna.

The holder may include fastening means for fastening the body to a dashboard. Advantageously, the driver's attention is impeded from being diverted from the road by the dashboard mounted phone when compared with otherwise handling the phone. The holder may include a plug-and-play connection means for coupling to an automotive computer.

According to another aspect of the present invention, there is provided a phone holder for holding a mobile phone, the holder including:
a support for supporting a phone and including a connector for connecting to the phone.

The support may be releasable from the holder. The support may include locating parts for locating the connector to suit engagement with the phone.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3a is a upper perspective view of a phone base support of the phone holder of FIG. 1;

FIG. 3b is an exploded view of the phone base support of FIG. 3a;

FIGS. 4b and 4c show a sectional view of the phone base support of FIG. 4a; and

DETAILED DESCRIPTION OF PREFERRED EMBODIMENTS

Figure 1:
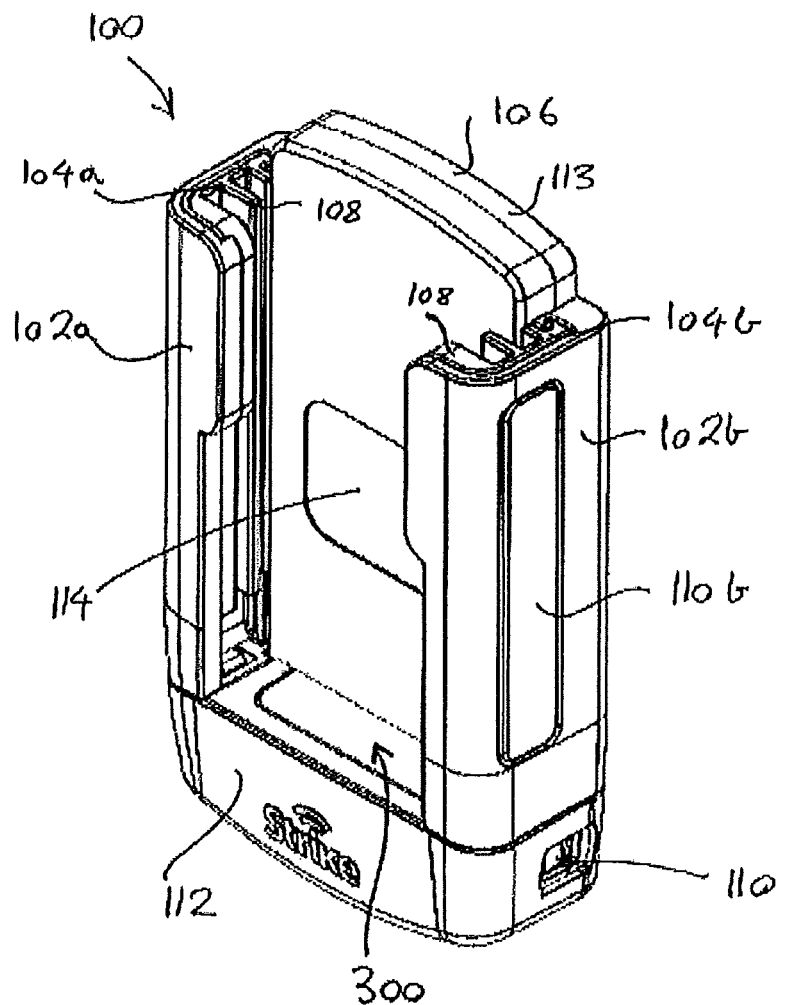
FIG. 1 is a front right perspective view of an automotive phone holder in accordance with an embodiment of the present invention.
Figure 2:
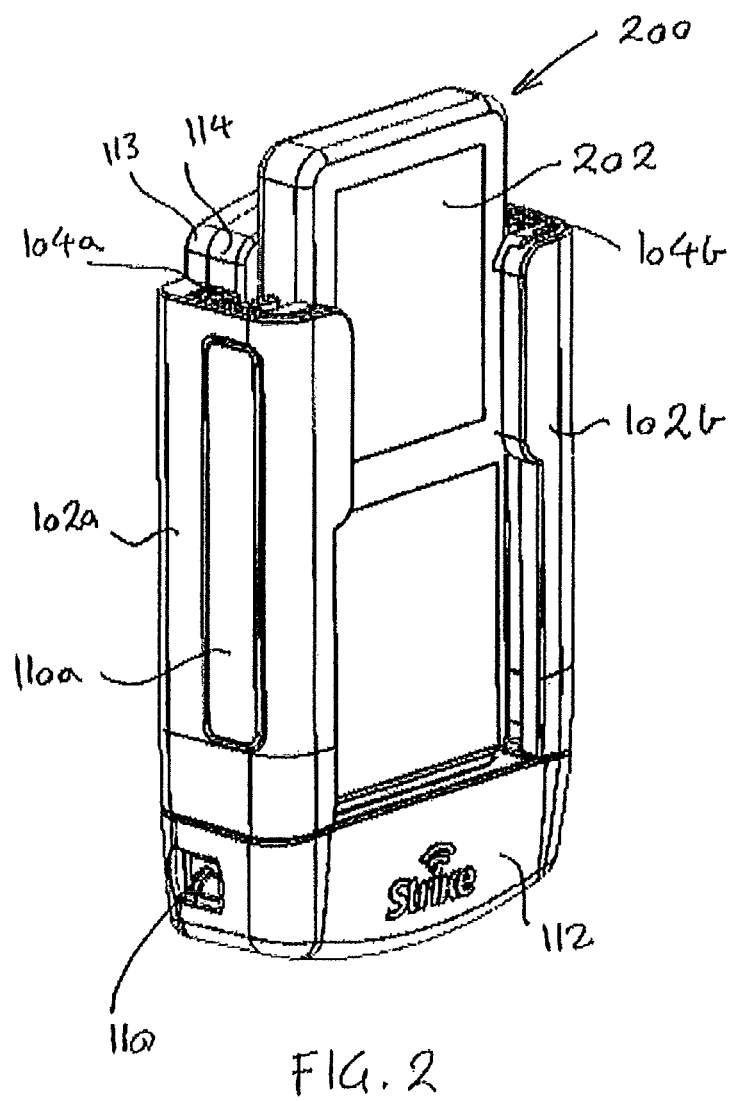
FIG. 2 is a front left perspective view of the phone holder of FIG. 1 holding a mobile phone.

According to an embodiment of the present invention, there is provided an automotive phone holder 100 in the form of a modular cradle as shown in FIG. 1. The phone holder 100 can hold a mobile phone 200 as can best be seen in FIG. 2. The holder 100 includes a pair of molded jaws 102a, 102b (i.e. lateral support means) between which a display 202 of the held phone 200 can be located. A pair of molded resilient rubber inserts 104a, 104b (i.e. insert means) is located between respective jaws 102a, 102b and lateral edges of the phone 200.

The inserts 104a, 104b are replaceable enabling the holder 100 to snugly hold any phone 200 by selecting suitable inserts 104a, 104b, and irrespective of whether the phone 200 is in a case. Similarly, the attachable jaws 102a, 102b are manufactured separately and suited to accommodate for a particular phone 202. Advantageously, the attachable jaws 102a, 102b and inserts 104a, 104b are mounted to a common body 106 used with holders 100 for all phone types. Further, manufacturing costs are desirably reduced because a single mold is required for forming the common body 106.

As can best be seen in FIG. 1, each insert 104 defines inwardly extending ribs 108. As can best be seen in FIG. 2, the ribs 108 engage with the lateral edges and the front of the phone 200. The compliant ribs 108 hold the phone 200 in compression from opposite sides and against the body 106. The smallest rib 108 of each insert 104 interlocks with a recess of a corresponding jaw 102. Furthermore, an opposing stalk 110 of each insert 104 complementarily fits within a retention aperture of a corresponding jaw 102.

The holder 100 also includes a phone charger 110 in its base for charging the held phone 200. A releasable molded charger coupler 112 is provided at the front of the holder 100 for coupling the charger 110 to the phone 200. As can best be seen in FIG. 1, the charger coupler 112 includes a removable support 300 for supporting the base of the phone 200.

Turning to FIG. 3, the support 300 includes a pair of rails 302a, 302b and a connector 304 able to move along the rails 302. A spacer 306 including separable parts 306a, 306b is provided for spacing the connector 304 at a desired location along the rails 302 to facilitate connection of the held phone 200. The rails 302a, 302b include flat plates 308a, 308b defining opposing channels 310 for receiving both the connector 304 and spacer 306. The connector 304 and spacer 306 include opposed sliding ribs 312 for being received in respective channels 310. The connector 304 is a micro USB connector.

The spacer 306 can be partitioned in two parts 306a, 306b at an appropriate location, or not at all, to locate the connector 304. The connector 304 and spacer 306 are slid into the channels 310 and held in place by the body 106 of the holder 100 once the support 300 is fitted to the holder 100. Advantageously, support 300 can be used to position the connector 304 to suit the type of phone 200, by simply selecting an appropriate configuration of the spacer 306. In this manner, the need to provide separate holders 100 or supports 300 for each model of phone is eliminated.

Figure 4A:
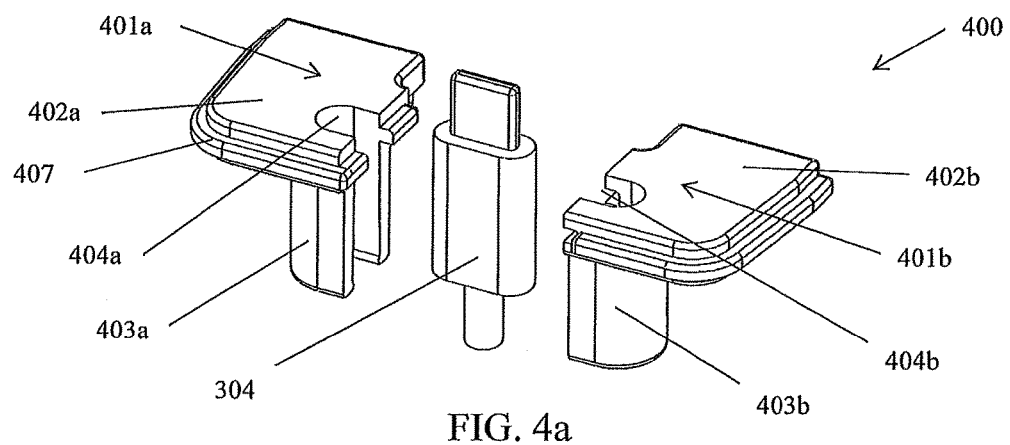
FIG. 4a is an exploded view of an another phone base support of the phone holder of FIG. 1.
Figure 4B:
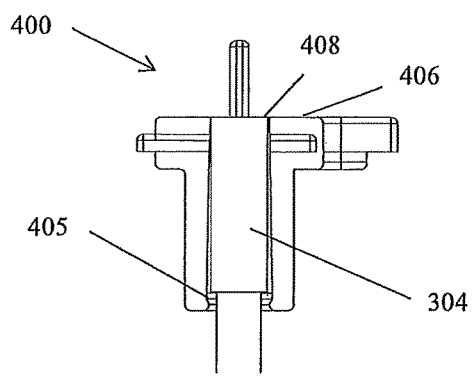
Figure 4C:
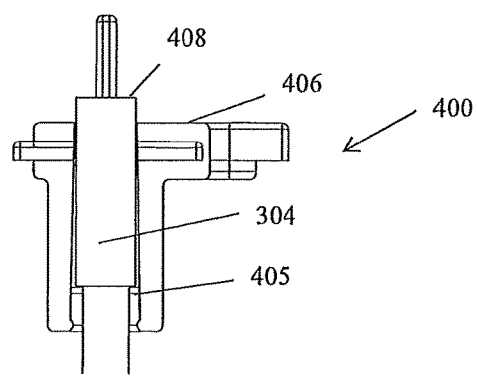

Turning to FIG. 4, an alternative releasable support 400 for the base of holder 100 includes a pair of male and female locating portions 401a, 401b for locating the connector 304. The portions 401a, 401b include flat plates 402a, 402b and extrusions 403a, 403b defining opposing channels 404a, 404b for receiving the connector 304. As best seen in FIGS. 4b and 4c, an insert 405 is received inside the support 400 for positioning the connector 304 relative to the upper surface 406 of support 400. The dimensions of the insert 405 can be varied so that the connector base 408 sits flush with the upper surface 406 (see FIG. 4b) for interfacing with phones having no cover, or raised (see FIG. 4c) to facilitate interfacing with phones having a cover. The connector is an Apply Lightning or 30-pin connector.

Figure 5:
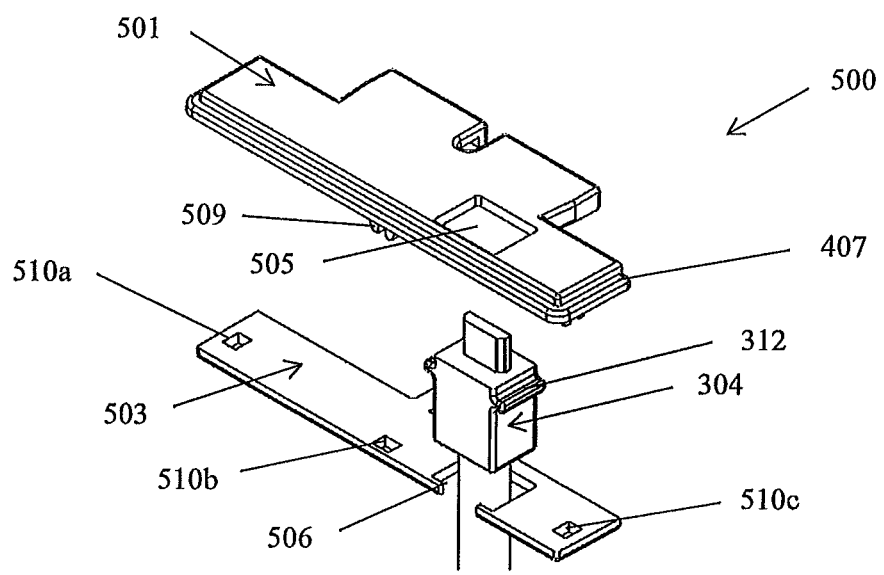
FIG. 5 is an exploded view of another alternative phone base support of the phone holder of FIG. 1.

Turning to FIG. 5, another releasable support 500 for the base of holder 100 includes the connector 304, and an upper portion 501 and lower portion 503 for locating the connector 304. The upper portion 501 further includes an aperture 505 defining a space for receiving charger connector 304, and male snap fittings 509 for securing to lower portion 503. The lower portion 503 further includes a corresponding aperture 506 also defining a space for receiving the connector 304, and apertures 510a, 510b, 510c for securing to corresponding male snap fittings 509. The connector 304 includes opposing side ribs 312 for being received within another space (not shown) defined between upper portion 501 and lower portion 503.

The connector 304 is locatable inside the apertures 505, 506 and positioned between upper portion 501 and lower portion 503 of the holder 500. The opposing ribs 312 prevent the charger connector 304 from fully passing through both the upper portion 501 and lower portion 503. The male snap fittings 509 connect to apertures 510a, 510b, 510c, thereby securing the upper and lower portions 501, 503 and the connector 304 together. The connector 304 is a micro USB connector. Advantageously, the upper portion 501, lower portion 503 and connector 304 can be dimensioned so that the connector is positioned at an appropriate depth and width of the holder 100 to engage with any type of phone.

Each of the supports 300, 400, 500 include a peripheral lip 407 to facilitate sitting engagement with the base of the holder 100. Either of the supports 300, 400, 500 can be fitted to the holder 100 to suit the type of phone.

Returning to FIG. 1, the holder 100 also includes an auxiliary antenna arrangement 113 in a rear backing panel for electrically coupling to an antenna of the held phone 200 to boost reception. A releasable molded antenna coupler 114 is fastened adjacent the auxiliary antenna arrangement 113 and couples the auxiliary antenna arrangement 113 to the phone antenna.

The rear of the holder 100 further includes fastening means in the form of a slotted profile or fastening the body 106 to a bracket extending from a vehicle dashboard. Advantageously, the driver's attention is impeded from being diverted from the road by the dashboard mounted phone 200 when compared with otherwise handling the phone 200.

The holder 100 also includes a location means, in the form of a near field communication. (NFC) integrated circuit (IC), by which the phone 200 can detect that it is located in the holder 100. Advantageously, the phone 200 can then enable certain Applications (Apps) or functions particular to driving such as Bluetooth on/off, screen dimming, GPS, caller ID, music etc.

The modular holder 100 can be used with a variety of different types of phones 100 by simply connecting appropriate jaws 102, inserts 104, charger coupler 112 and antenna coupler 114 to the same body 106.

A person skilled in the art will appreciate that many embodiments and variations can be made without departing from the ambit of the present invention.

In one embodiment, the fastening means of the holder 100 includes a plug-and-play connection means for coupling to an automotive computer, vehicle power or other vehicle components.

In one embodiment, the antenna coupler 114 and auxiliary antenna arrangement 113 are combined as a single part.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A phone holder for holding a mobile phone, the holder including:
   a base support for supporting a base of the mobile phone and including a connector for connecting to the mobile phone, the base support further including:
      a plurality of connector locating panels located wholly beneath the mobile phone for locating the connector to suit the mobile phone, wherein the connector locating panels define an aperture through which the connector extends for locating the connector in a fixed position.

2. A phone holder as claimed in claim 1, wherein the support is reconfigurable to reposition the connector locating panels to suit the phone.

3. A phone holder as claimed in claim 2, wherein the connector can be reconfigured axially.

4. A phone holder as claimed in claim 3, wherein the support includes a spacing arrangement for increasing the protrusion of the connector from a phone engagement surface to accommodate for a phone cover.

5. A phone holder as claimed in claim 3, wherein the support includes a spacer including separable parts for spacing the connector at a desired location.

6. A phone holder as claimed in claim 5, wherein the separable parts and connector are configured to slide into position.

7. A phone holder as claimed in claim 1, wherein the connector includes one or more engagement ribs.

8. A phone holder as claimed in claim 7, wherein the support includes one or more rails with which the ribs engage.

9. A phone holder as claimed in claim 7, wherein the support includes one or more plates with which the ribs engage.

10. A phone holder as claimed in claim 1, wherein the support includes a pair of male and female locating portions for locating the connector.

11. A phone holder as claimed in claim 10, wherein each portion includes a flat plate, and a receptacle for receiving the connector.

12. A phone holder as claimed in claim 11, wherein the receptacles together form a stem.

13. A phone holder as claimed in claim 12, further including one or more spacers for locating in the stem to space the connector.

14. A phone holder as claimed in claim 1, wherein the support includes an upper portion and lower portion for locating the connector.

15. A phone holder as claimed in claim 14, wherein the upper portion defines a space for receiving the connector.

16. A phone holder as claimed in claim 14, wherein the lower portion defines a space for receiving the connector.

17. A phone holder as claimed in claim 14, further including snap fittings for snap fitting the upper and lower portions together whilst retaining the connector.

18. A phone holder as claimed in claim 1, wherein the support includes a peripheral lip to facilitate sitting engagement with a base of the holder.

19. A phone holder as claimed in claim 1, the holder including:
   other supports for fitting to the holder to support different phones, the supports including connectors in different positions to facilitate connecting to respective phones, the supports locating the connector in a fixed position.

* * * * *